United States Patent
Dunford et al.

(10) Patent No.: US 9,290,669 B2
(45) Date of Patent: Mar. 22, 2016

(54) WATERBORNE ANTIFOULING COATING COMPOSITION

(75) Inventors: Graeme Dunford, Tyne and Wear (GB); Colin Dudgeon Anderson, Tyne and Wear (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/360,450

(22) PCT Filed: Sep. 3, 2012

(86) PCT No.: PCT/EP2012/067067
§ 371 (c)(1),
(2), (4) Date: May 23, 2014

(87) PCT Pub. No.: WO2012/150360
PCT Pub. Date: Nov. 8, 2012

(65) Prior Publication Data
US 2014/0318433 A1    Oct. 30, 2014

Related U.S. Application Data

(60) Provisional application No. 61/577,758, filed on Dec. 20, 2011.

(30) Foreign Application Priority Data

Dec. 2, 2011  (EP) .................................. 11191775

(51) Int. Cl.
| | | |
|---|---|---|
| C09D 5/14 | (2006.01) | |
| C09D 5/16 | (2006.01) | |
| B63B 1/34 | (2006.01) | |

(52) U.S. Cl.
CPC ............... C09D 5/1618 (2013.01); B63B 1/34 (2013.01); C09D 5/14 (2013.01); C09D 5/16 (2013.01); C09D 5/1625 (2013.01)

(58) Field of Classification Search
CPC .......... C09D 5/14; C09D 5/16; C09D 5/1618
See application file for complete search history.

(56) References Cited

U.S. PATENT DOCUMENTS

| | | | |
|---|---|---|---|
| 3,898,190 A | 8/1975 | Willey | |
| 4,191,579 A | 3/1980 | Hails et al. | |
| 4,314,850 A | 2/1982 | Watanabe et al. | |
| 4,752,629 A | 6/1988 | Proudlock et al. | |
| 5,057,153 A | 10/1991 | Ruggiero | |
| 5,185,033 A | 2/1993 | Hani et al. | |
| 6,045,869 A * | 4/2000 | Gesser et al. | 427/385.5 |
| 6,211,262 B1 | 4/2001 | Mejiritski et al. | |
| 8,545,615 B2 * | 10/2013 | Roulleaux et al. | 106/270 |
| 2006/0246097 A1 | 11/2006 | Hidaka | |
| 2011/0184088 A1 | 7/2011 | Lohmeijer et al. | |

FOREIGN PATENT DOCUMENTS

| | | |
|---|---|---|
| DE | 198 11 314 | 9/1999 |
| EP | 0 108 634 | 5/1984 |
| EP | 0 051 930 | 4/1985 |
| EP | 0 219 043 | 4/1987 |
| EP | 0 204 456 | 10/1991 |
| EP | 0 779 304 | 4/2000 |
| EP | 1 724 310 | 11/2006 |
| EP | 1 958 991 | 8/2008 |
| EP | 1 988 105 | 11/2008 |
| EP | 2 182 033 | 5/2010 |
| EP | 2 386 608 | 11/2011 |
| GB | 1 457 590 | 12/1976 |
| GB | 2 337 950 | 12/1999 |
| JP | 11-616 | 1/1999 |
| JP | 2009-173914 | 8/2009 |
| WO | 96/03465 | 2/1996 |
| WO | 97/00919 | 1/1997 |
| WO | 99/37723 | 7/1999 |
| WO | 00/43460 | 7/2000 |
| WO | 02/02698 | 1/2002 |
| WO | 03/037999 | 5/2003 |
| WO | 2004/018533 | 3/2004 |
| WO | 2005/005516 | 1/2005 |
| WO | 2005/075581 | 8/2005 |
| WO | 2005/075582 | 8/2005 |
| WO | 2006/077738 | 7/2006 |
| WO | 2007/070769 | 6/2007 |
| WO | 2010/018144 | 2/2010 |
| WO | WO 2010103209 A1 * | 9/2010 |
| WO | WO 2012054691 A2 * | 4/2012 |
| WO | 2012/150360 | 11/2012 |

OTHER PUBLICATIONS

International Search Report for Application No. PCT/EP2012/067067, mailed no Jan. 17, 2013.
European Search Report for EP Application No. 11191775.3, dated Apr. 26, 2012.

* cited by examiner

Primary Examiner — Brieann R Fink
(74) Attorney, Agent, or Firm — Kenyon & Kenyon LLP

(57) ABSTRACT

The invention provides a waterborne antifouling coating composition comprising (i) a binder polymer, (ii) a pigment and (iii) no biocide or a biocide selected from (a) a copper biocide or a copper biocide in combination with at least one or more co-biocide(s), or (b) a copper-free biocide or a copper-free biocidein combination with at least one or more co-biocide(s), with the proviso that the biocide is not a copper biocide in combination with zinc pyrithione, and wherein the pigment volume concentration of the waterborne antifouling coating composition is greater than 80% and less than 95%.

18 Claims, No Drawings

WATERBORNE ANTIFOULING COATING COMPOSITION

REFERENCE TO RELATED APPLICATIONS

This application is the U.S. National Phase of PCT/EP2012/067067, filed on Sep. 3, 2012, and claims the benefit of EP Application No. 11191775.3, filed on Dec. 2, 2011, and U.S. application No. 61/557,758, filed on Dec. 20, 2011.

FIELD OF THE INVENTION

The present invention relates to a waterborne antifouling coating composition, the use of the waterborne antifouling coating composition to coat a substrate and articles coated with the waterborne antifouling coating composition.

BACKGROUND ART

Man-made structures such as boat hulls, buoys, drilling platforms, oil production rigs, and pipes which are immersed in water are prone to fouling by aquatic organisms such as green and brown algae, barnacles, mussels, and the like.

Such structures are commonly of metal, but may also comprise other structural materials such as glass reinforced plastic (GRP), concrete or wood. This fouling is a nuisance on boat hulls because it increases frictional resistance during movement through the water, the consequence being reduced speeds and/or increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use antifouling coatings, for instance as a top coat on underwater hulls, to inhibit the settlement and growth of marine organisms such as barnacles and algae, generally by release of a biocide for the marine organisms. Many successful antifouling coatings in recent years have been "self-polishing copolymer" paints based on a polymeric binder to which leaving group moieties are chemically bound, and from which leaving group bonds to the polymer backbone are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the coating layer on the ship is washed out or eroded. Such paint systems are described for example in GB-A-1 457 590, EP779304, WO2005005516, WO200202698, WO2004018533 or WO201018144 and WO9937723.

Current marine solvent-borne antifouling coatings release significant volumes of organic solvent into the atmosphere upon coating application. This is harmful to the environment and will be legislated against increasingly in the coming years. The volatile organic content (VOC) of antifouling coatings is already restricted by legislation in many countries. For example, the European Solvents Emissions Directive limits the VOC to less than 270 g/kg—equivalent to about 450 g/l—for the overall emissions from shipyards which apply antifouling coatings compositions, whilst in the South Coast Air Quality Management District (SCAQMD) of California, USA an upper limit of 330 g/l for pleasure craft antifouling paints is in force.

Waterborne formulations offer the potential to significantly reduce the organic solvent content of antifouling coatings. Such coatings can also be referred to as water-based or aqueous coatings. The waterborne antifouling coating compositions, by definition comprise water (usually more than 20 weight % based on the weight of all the components in the coating composition). The waterborne coating compositions disclosed in this patent application typically have VOC<100 g/l, and also surprisingly <50 g/l, and more surprisingly <10 g/l (as formulated).

Besides these VOC demands, antifouling coatings on boats should provide adequate antifouling protection. Further, the coating should show hardly any so-called cold flow or plastic deformation, in other words, the film should not ripple when the ship moves in the water. Additionally, the coating composition needs to show a sufficiently short drying time. Further, the antifouling coatings should be stable during storage.

JP2009173914 and WO2006/077738 and EP1958991 disclose waterborne antifouling systems prepared by latex polymerisation.

Waterborne antifouling systems are currently believed to have inferior mechanical strength and film properties compared to solvent-borne systems. It is believed that the water sensitive nature of these systems means that water can be absorbed too easily and result in weakness of the paint films. It is known that the Pigment Volume Concentration (PVC) is key to the aesthetics and physical properties of a coating composition. PVC is defined as the ratio of pigment volume to the total dry film volume. The higher the PVC, the more the potential voids in the dried coatings and the higher the water permeability. Typical antifouling compositions have a PVC of no more than 60%.

WO 97/00919 discloses an antifouling paint having little or no biocidal activity, an essentially insoluble film-forming binder, the PVC being in the region of the critical pigment concentration (CPVC). However, WO 97/00919 fails to disclose waterborne coating compositions having a Pigment Volume Concentration greater than 80% as required by the present invention. All the coating compositions in the examples have a PVC ranging from between 54.6% to 78.2%. Further, all of the coating compositions exemplified in WO 97/00919 are solvent-based systems, and no waterborne systems are exemplified or enabled. In fact, the inventors have found that the solvent-based coating composition of Example 11 in WO 97/00919 (which has the closest PVC value to that required by the present invention), when applied and dried to a substrate, cracks and delaminates from the surface and therefore is unsuitable for use as an antifouling coating composition. It is therefore surprising that when the antifouling coating composition is not a solvent-based system, but a waterborne-system as defined according to the present invention, having a higher PVC than suggested in WO 97/00919, the coating produced therefrom has good mechanical strength and structural integrity as well as good antifouling protection.

SUMMARY OF THE INVENTION

According to a first aspect of the present invention there is provided a waterborne antifouling coating composition comprising (i) a binder polymer, (ii) a pigment and (iii) no biocide or a biocide selected from (a) a copper biocide or a copper biocide in combination with at least one or more co-biocide or (b) a copper-free biocide or a copper-free biocide in combination with at least one or more co-biocide(s), with the proviso that the biocide is not a copper biocide in combination with zinc pyrithione, and wherein the Pigment Volume Concentration of the waterborne antifouling coating composition is greater than 80% and less than 95%.

Suitably, the biocide is either a copper biocide or a copper biocide in combination with at least one co-biocide, with the proviso that the co-biocide is not zinc pyrithione.

The (solid) amount of the binder polymer in the coating composition may range between 0.5 to 3.0 wt %, based on the total weight of all the components (solid and liquid) in the coating composition.

Surprisingly, the inventors have found that when a waterborne antifouling composition is prepared according to the first aspect of the present invention the dried coating composition has a combination of good mechanical strength and structural integrity, with good antifouling protection and long term stability when stored in one vessel.

Due to the very high PVC of the waterborne antifouling compositions of the present invention, the composition when dried contains air voids. Without wishing to be bound by theory, it is thought that when a coated substrate is immersed into an aqueous environment, due to the presence of air voids in the dried coating, water is able to easily penetrate and contact the pigments resulting in effective diffusion from the film of the biocide(s). The immersed coating composition, due to its porous nature, slowly breaks away over time (polishing action) leaving a fresh layer of polymer and biocide(s) resulting in prolonged antifouling action over time. The penetration of the water into the coating composition also results in the pigments becoming "fully wetted out", helping to develop a bright and aesthetically pleasing colour whilst the coated substrate is immersed.

Surprisingly, the bright and aesthetically pleasing colour of the coating when fully wetted out is bright enough to be suitable for use as a top coat for yachts.

A further advantage to the present waterborne antifouling coating composition is that they typically have VOC<100 g/l (as formulated) whilst maintaining good mechanical properties. Not only is the waterborne antifouling coating composition of the present application better for the environment than traditional solvent borne systems, and some known aqueous/waterborne systems, but is beneficial to users of such paint, who will see the positive effects of reduced organic solvent emissions, both with respect to their successful compliance with regulations (avoidance of punitive fines), and with respect to the environmental impact and profile of their organisation.

According to a second aspect of the present invention there is provided an article coated with the waterborne antifouling coating composition according to the first aspect of the invention.

According to a third aspect of the present invention there is provided a method of preventing fouling on an article in an aqueous environment by coating said article with the waterborne antifouling composition according to the first aspect of the invention, and submersing said coated article in said aqueous environment. Suitably, the article is a marine vessel, such as a yacht.

According to a forth aspect of the present invention there is provided the use of the waterborne antifouling coating composition according to the first aspect of the invention to coat a substrate to prevent fouling on an article.

The waterborne antifouling coating composition according to the first aspect of the present invention can be used to provide marine antifouling coatings of very low volatile organic content (VOC) without compromising on mechanical properties, antifouling performance and storage stability in one pack.

DETAILED DESCRIPTION

Binder Polymer

The waterborne antifouling coating composition comprises a binder polymer.

The (solid) amount of binder polymer in the waterborne antifouling coating composition may range from 0.5 weight % to 3.0 weight %. More preferably the (solid) amount of binder polymer in the antifouling composition ranges between 1.2 weight % to 2.5 weight %, based on the total weight of all the components in the waterborne antifouling coating composition.

The term "(solid)" amount of binder polymer means the amount of binder polymer in the coating composition excluding solvent (i.e. dry). Clearly, "solid" and "dry" does not describe the state of the binder polymer whilst dissolved in the coating composition. Rather, the term "solid" is used to make clear that the amount of binder polymer in the coating composition is the amount of binder polymer excluding the solvent it is dissolved in. The solid amount of binder polymer in the coating composition is therefore equal to the amount of solid binder that would be in the dry film of a coating formed therefrom.

In the context of the present application, weight % (weight percent) of a component means the percentage by weight of the component (solid) out of total weight of all the components (all solid and liquid components) in the antifouling coating composition.

The binder polymer is preferably added to the waterborne antifouling composition as a suspension in water, wherein the suspension optionally also comprises an organic solvent.

For example, the binder polymer of the present invention may be present in the waterborne coating as a: classical latex (latex), urethane latex or as a dispersion polymer.

Classical latexes (often known as "latexes") and their use in traditional waterborne/aqueous coatings, and their preparation by emulsion polymerisation techniques are well known in the art. A latex is often defined as a stable dispersion (emulsion) of polymer microparticles in an aqueous medium. The modern seeded semi-batch synthesis allows precise particle size control and versatile modification of the morphology of latex particles. Latexes generally have high molecular weights (>100,000).

Urethane latexes (polyurethane latexes) are also well known in the art and are similar to classical latexes in the sense that they have high molecular weights (>100,000) achieved by reactions in aqueous media and their particle sizes are defined primarily by the chemistry of the aqueous reactions. Polyurethane latexes are the products of the reaction between isocyanate terminated prepolymers and aqueous diamines.

Dispersion polymers differ from classical and polyurethane latexes in that they have lower (<20,000) molecular weights and are synthesized in non-aqueous media and are then dispersed into water by mechanical means. Their particle sizes are strongly dependent on the shearing forces employed as they are mechanically dispersed into water. This class of dispersion polymers encompass alkyds, polyesters, acrylics and epoxies and forms films only when crosslinked. Dispersion polymers may comprise more than one component, for example urethanes and epoxies.

The binder polymer may be constituted from one or more different binder polymers. The binder polymer(s) of the present invention should be essentially insoluble in water. Preferably, the solubility of the binder polymer(s) is below 0.5 parts per million by weight. The binder polymers may be both in clear and pigmented form. The binder polymer of the present invention may be one type of binder polymer or a combination of more than one different binder polymers provided that the total amount of binder polymer(s) present in the waterborne antifouling coating composition ranges from 1.5 weight % to 3.0 weight %, based on the total weight of all the components in the waterborne antifouling coating composition. Preferably the total amount of binder polymer(s) in the waterborne antifouling coating composition ranges from 1.2 weight % up to 2.5 weight %, based on the total weight of all the components in the waterborne antifouling coating composition.

Typically, the percentage of the dry binder polymer volume to the total dry film volume of a coating prepared from the coating composition of the present invention ranges from 0.6% to 3.7%. Preferably, the percentage of the dry binder polymer volume to the total dry film volume ranges from 0.8% to 3.5%, and more preferably between 1% to 3%.

As examples of typical binder polymers the following may be mentioned: acrylic resins, vinyl resins, polyurethane dispersions, alkyd resins, epoxy polymers, epoxy esters, epoxy amines, epoxy urethanes, polyurethanes, vinyl ether polymers, for example a poly(vinyl alkyl ether), such as polyvinyl isobutyl ether, or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, and a vinyl acetate polymer such as polyvinyl acetate or a vinyl acetate/vinyl chloride copolymer.

Typical ethylenically unsaturated monomers which may be used alone or in combination to prepare the acrylic binder polymers are: (meth)acrylate esters such as (methyl)methacrylate, ethyl(meth)acrylate, butyl(meth)acrylate, 2-hydroxyethyl(meth)acrylate, cyclohexyl(meth)acrylate, methoxyethyl(meth)acrylate, isobornyl(meth)acrylate, poly(ethylene oxide) functional (meth)acrylate monomers such as poly(ethylene oxide) (n=8) monoalkyl ether (meth)acrylate, methoxyethyl(meth)acrylate, ethoxyethyl(meth)acrylate propoxyethyl(meth)acrylate, butoxyethyl(meth)acrylate or N-vinyl pyrrolidone or styrene and its substituted derivatives, vinyl acetate, vinyl 2-ethylhexanoate, acrylic acid, acrylonitrile, glycidyl(meth)acrylate, and the like.

The waterborne antifouling coating composition may also include as a constituent part of the binder polymer, dispersions of rosin, and/or derivatives of rosin, and/or dispersions of one or more acrylic self-polishing co-polymer(s) (SPC) which contain groups capable of hydrolysing, dissociating or undergoing ion-exchange in sea water. Examples of such antifouling coatings are disclosed in EP 0204456, EP779304, WO200202698 and WO2004018533, WO2005005516, and WO9937723.

The rosin material is preferably wood rosin or alternatively tall oil rosin or gum rosin. The main chemical constituent of rosin is abietic acid. The rosin can be any of the grades sold commercially and can alternatively be a rosin derivative, for example a maleinised or fumarised rosin, hydrogenated rosin, formylated rosin or polymerised rosin, or a rosin metal salt such as calcium, magnesium, copper or zinc rosinate. Examples of water dispersions of rosin materials are the 'Tacolyn' range of products from the Eastman Chemical Company.

Preferably the binder polymer of the invention is a latex/emulsion. Most preferably the binder polymer of the invention is an acrylic latex/emulsion. A suitable example is Primal AC-26-K Emulsion or Rhoplex AC-2235C Emulsion ex Dow Chemicals.

Other components that can be added to the binder polymer include plasticizers and emulsifying surfactants.

Plasticisers will preferably be used in a dispersed or emulsified form.

Suitable emulsifying surfactants include poly(ethylene oxide)-block-poly(propylene oxide)-block-poly(ethylene oxide) polymers such as the Pluronic range of surfactants manufactured by BASF Aktiengesellschaft or the Synperonic range manufactured by Uniqema Inc; Polysorbate surfactants such as poly(ethylene oxide) sorbitan fatty acids; aliphatic ethers of poly(ethylene oxide) such as the 'Brij' range of compounds available from Croda International plc; carboxylic acid functional polymeric surfactants such as Orotan 731A manufactured by Rohm and Haas/Dow Chemical Company, anionic sulfate or sulfonate functional surfactants such as Aerosol OT from Cytec Industries, and Acetylenic diol surfactants such as Surfynol 104 manufactured by Air Products and Chemical Inc.

Pigment

The waterborne antifouling coating of the present invention comprises one or more pigment(s). The pigment(s) may be colouring pigments and/or extender pigments.

The Pigment Volume Concentration (PVC) of the waterborne antifouling coating composition must be greater than 80% and less than 95%. Preferably, the PVC is greater than 82% and less than 95%. Most preferably the PVC is greater than 82% but less than 87%. In the present application, PVC is defined as the ratio of dry pigment volume to the total dry film volume (×100).

Suitably the Pigment Mass Concentration (PMC) of the waterborne antifouling coating composition is less than 99%. Preferably, the PMC of the waterborne antifouling coating composition is greater than 92% and less than 99%, more preferably the PMC is greater than 93% and less than 97%. In the present application, PMC is defined as the ratio of dry pigment mass to the total dry film mass (×100).

The coating compositions of the present invention, wherein the PVC is greater than 80% and less than 95%, and the PMC is less than 99% are preferred. Optimally, the PMC is greater than 92%. The coatings from these coating compositions surprisingly have a combination of good mechanical strength and structural integrity, with good long term antifouling protection. Further, the composition when dried contains air voids, and when the coating composition is immersed in water, water penetrates these voids and brings out an amazingly bright and aesthetically pleasing colour. The water that penetrates the voids helps effective diffusion of the biocide(s), if present.

The pigment volume concentration of the waterborne antifouling coating composition may be around the critical pigment volume concentration (CPVC) although is preferably greater than the CPVC. For example the ratio of PCV:CPVC may range between 0.8 to 1.5, and may even be greater than 1.5. The CPVC is normally defined as the pigment volume concentration where there is just sufficient binder to provide a complete adsorbed layer of binder on the pigment surfaces and to fill all the interstices between the particles in a close-packed system. The CPVC can be determined by wetting out dry pigment with just sufficient linseed oil to form coherent mass. This method yields a value known as the "oil absorption" from which the CPVC can be calculated. The method for determining oil absorption is described in British Standard 3483 (BS3483)

The pigment may be biocidal or non-biocidal. If the pigment has marine biocidal properties, then in the context of the present invention, the presence of that pigment also constitutes as the presence of a biocide. Of course, this is the same vice versa: if a biocide also acts as a pigment, then the presence of the biocide also constitutes as the presence of a pigment. In other words, the presence of a biocide counts towards the pigment volume concentration. If the quantity of biocide in the waterborne antifouling coating composition is such that the pigment volume concentration is greater than 80% but less than 95%, preferably greater than 82% and less than 95% and most preferably greater than 82% but less than 85%, then a further pigment does not needed to be added to the waterborne antifouling composition.

Examples of such pigments which are also aquatic biocides include copper or zinc compounds, such as cuprous oxide, cuprous thiocyanate, cuprous sulphate, zinc ethylene bis (dithiocarbamate), zinc dimethyl dithiocarbamate, copper pyrithione, zinc diethyl dithiocarbamate, copper resinate or cuprous ethylene bis(dithiocarbamate).

Examples of suitable non-biocidal pigment fillers that are sparingly soluble in seawater (solubility in seawater of from 0.5 to 10 parts per million by weight) are zinc oxide, calcium sulphate and barium sulphate. Examples of seawater-insoluble pigments (solubility below 0.5 parts per million by weight) are titanium dioxide, ferric oxide, phthalocyanine compounds, talc and azo pigments. Mixtures of sparingly soluble pigments can be used, for example cuprous oxide, cuprous thiocyanate or zinc ethylene bis(dithiocarbamate), which are highly effect biocidal pigments, can be mixed with zinc oxide, which is not effective as a biocide but acts as an adjuvant to enable the copper compounds to dissolve more rapidly in seawater. Copper metal can also be present as an aquatic biocide, for example in flake or powder form.

Biocide

The waterborne antifouling coating composition of the present invention may be biocide free or may comprise a biocide. The biocide may be a copper biocide or a copper biocide in combination with at least one co-biocide or a copper-free biocide or a copper-free biocide in combination with at least one or more co-biocide(s). However the biocide may not be a copper biocide in combination with zinc pyrithione.

Examples of copper biocides include copper oxides, such as cuprous oxide, copper thiocyanate, copper bronze, copper carbonate, copper chloride and copper nickel alloys, copper pyrithione, bis (N-cyclohexyl-diazenium dioxy) copper. Preferred copper biocides are cuprous oxide and copper thiocyanate. The most preferred copper biocide is cuprous oxide.

Examples of copper-free biocides include zinc pyrithione, silver salts such as silver chloride or nitrate; organometallic and metal-organic biocides include zinc ethylene-bis(dithiocarbamate) (i.e. zineb), zinc dimethyl dithiocarbamate (ziram), and manganese ethylene-bis(dithiocarbamate) (ie maneb), which can be complexed with a zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl)maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopropylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroiso-phthalonitrile, tolylfluanid, dichlofluanid, diiodomethyl-p-tolylsulphone, N-cyclopropyl-N'-(1,1-dimethylethyl)-6-(methylthio)-1,3,5-triazine-2,4-diamine, 3-iodo-2-propynyl butyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene)-2(5H)-furanone, and mixtures thereof, and quaternary ammonium salts such as didecyldimethylammonium chloride and an alkyldimethylbenzylammonium chloride and mixtures thereof.

The co-biocide(s) may be any of the copper containing biocide(s) and/or copper-free containing biocide(s) as mentioned in the preceding paragraphs. However, the antifouling coating composition may not comprise a copper biocide in combination with zinc pyrithione.

Preferred co-biocides include one or more of the following: Copper Pyrithione. 2-methylthio-4-terbutylamino-6-cyclopropylamino-s-triazine (otherwise called Irgarol 1051); 1,1-dichloro-N-[(dimethylamino)sulfonyl]-1-fluoro-N-phenyl-methanesulfenamide (otherwise called Dichlofluanid, Preventol A4S); 1,1-Dichlor-N-((dimethylamino)sulfonyl)-1-fluor-N-(4-methylphenyl)-methansulfenamid (otherwise called Tolylfluanid, Preventol A5S); 4,5-dichloro-2-(n-octyl)-3(2H)-isothiazolone (DCOIT, Kathon 287T), 2,4,5,6-tetrachloro-isophthalonitrile (otherwise called Nopocide N96); 2-(thiocyanomethylthio)-benzothiazole (TCMTB); Tetramethylthiuram disulphide (TMT); zinc dimethyl dithiocarbamate (called ZDMC or ziram); Manganese Ethylene-bisdithiocarbamate (Maneb); 4-[1-(2,3-dimethylphenyl)ethyl]-3H-imidazole (otherwise called Medetomidine) and Zinc Ethylene bis-Dithiocarbamate (Zineb) and zinc pyrithione.

Most preferred co biocides are one or more of the following: Copper Pyrithione, Dicholfluanid, Tolylfluanid, zinc ethylene bis-dithiocarbamate, dicholoroctylisothiazolone, 2-methylthio-4-terbutylamino-6-cyclopropylamino-s-triazine and zinc pyrithione.

When the biocide is a copper biocide or a copper biocide, zinc pyrithione cannot be one of the co-biocides in the waterborne antifouling coating composition of the present invention. It has been found by the inventors that when the co-biocide is zinc pyrithione, that the waterborne antifouling coating composition becomes unstable and solidifies.

The biocide usually needs to be treated with a dispersing agent to generate a water-dispersible composition. This treatment can be performed either prior to the preparation of the coating formulation, or it can be performed during the preparation of the coating formulation by mixing the biocide with dispersing agent along with the other paint components.

Furthermore, the biocide may optionally be wholly or partially encapsulated, adsorbed, absorbed, supported or bound. Certain biocides are difficult or hazardous to handle and are advantageously used in an encapsulated or adsorbed or absorbed or supported or bound form. Additionally, encapsulation, adsorption, absorption, support or binding of the biocide can provide a secondary mechanism for controlling biocide leaching from the coating system in order to achieve an even more gradual release and long lasting effect.

Additional Components

Additional components which may be added to the waterborne antifouling coating composition includes coalescing agents, co-solvents and freeze-thaw stabilizing co-solvent additives, thickening and anti-settlement agents, defoaming additives, hydrophobic or hydrophilic fluids, in-can biocides/preservatives, wetting agents and flow promoting agents.

Examples of suitable coalescing agents include Texanol (2,2,4-trimethyl-1,3-pentanediol monoisobutyrate), Dowanol DPnB (dipropyleneglycol n-butyl ether), 2(2-methoxyethoxy)ethanol, benzyl alcohol, butanol, mono and dialkyl ethers of mono and diethylene glycol and mono and dipropylene glycol, for example ethylene glycol mono n-butyl ether and diethyleneglycol dibutyl ether.

Examples of suitable co-solvents and freeze-thaw stabilizing co-solvent additives include propane-1,2-diol, propylene glycol diacetate, dipropylene glycol dimethyl ether and Rhodoline FT100, a freeze-thaw stabilizing additive available from the Rhodia company. Coalescing agents and co-solvents may also be added during the emulsification procedure, either to the initial polymer organic solvent solution or to the emulsion after the organic solvent removal has been performed.

Examples of suitable thickening agents include non-associative types such as Bentone clays, Attapulgite, hydroxyethyl cellulose (HEC) and its derivatives, silicas, kaolins and metal chelates, and associative types such as hydrophobically modified ethoxylate urethanes (HEUR), polyether polyols, hydrophobically modified alkali swellable/soluble emulsions (HASE), hydrophobically modified HECs. Natural thickening additives such as casein, alginates, seaweed extracts, starches and gums may also be used. Suitable anti-settlement agents include Disparlon AQ-600 supplied from Kusumoto Chemical Ltd.

Examples of suitable defoaming additives include hydrocarbon based compositions such as Foamaster NDW as manufactured by Cognis Corporation, silicone types such as Byk 022 from BYK-Chemie GmbH and poly(ethylene oxide)-block-poly(propylene oxide)-block-poly(ethylene oxide) polymers having relatively short poly(ethylene oxide) blocks such as Pluronic PE10100 from BASF Aktiengesellschaft.

Examples of suitable hydrophobic or hydrophilic fluids include silicone oils, flourosilicone polymers and poly(ethyleneglycol).

Examples of suitable in-can preservatives include the Acticide range of isothiazoline compounds from Thor Chemicals. Examples of suitable wetting agents include silicone types such as Byk 346, a polyether modified dimethylpolysiloxane available from BYK-Chemie GmbH, and non-silicone types such as Aerosol OT (Sodium dioctyl sulfosuccinate) available from Cytec Industries Inc. Examples of suitable flow promoting agents include Byk 349, a polyether modified siloxane from BYK-Chemie GmbH.

The waterborne antifouling coating composition of the present invention may also comprise a small quantity of organic solvent. By small quantity, we mean less than 5 wt % of the total wet (i.e. non dried) formulation. Examples of organic solvents that can be used, either as sole solvent or as mixtures, include aromatic solvents such as xylene, toluene and trimethylbenzene, alcohols such as n-butanol and isopropanol, ethers such as tetrahydrofuran and dioxane, esters such as butyl acetate and ketones such as methylisobutyl ketone and cyclohexanone.

Formulation of the Coating Composition in One Package

The coating composition may be formulated in one package, or in more than one package (for example 2 packages) and combined prior to application. Formulation of the coating composition in one package is preferred.

VOC Level

As a consequence of the coating composition being waterborne, the VOC level of the composition, as formulated, is below 250 g/l, may be below 200 g/l, may be below 150 g/l may be below 100 g/l and surprisingly may be below 50 g/l, and below 10 g/l. The volatile organic content (VOC) is determined in accordance with the method of ISO3251.

Viscosity

When a value is given for the viscosity of a coating composition according to the present invention, reference is made to the high shear viscosity measured using a cone and plate viscometer in accordance with ASTM standard D 4287-00 at 23 degrees C.

Stability of the Antifouling Composition During Storage

The stability of the antifouling composition is measured according to the following methods: ASTM D 869 and ASTM D 1849.

Use of the Waterborne Antifouling Composition

The waterborne antifouling coating composition according to the present invention is very suitable for use in preventing fouling in marine and freshwater applications. The coating composition can be used for both dynamic and static structures, such as yacht, ship and boat hulls, buoys, drilling platforms, oil production rigs, pipes, fish nets, fish cages and other aquaculture apparatus and the like which are wholly or partially immersed in water either permanently or intermittently.

When applied to the exterior portion of a yacht, ship or boat hull, the coating composition of the present invention is normally applied as a topcoat. As such it can be applied in the normal coating scheme for new build vessels and also for maintenance and repair of existing vessels. The coating composition is particularly suitable for use a top coat for a yacht due to the bright colour that is produced, when the yacht is immersed in an aqueous (marine) environment.

The invention will now be elucidated with reference to the following examples. These are intended to illustrate the invention but are not to be construed as limiting in any manner the scope thereof.

EXAMPLE 1

Preparation of Coating Compositions A-G

The following materials were mixed in the stated parts by weight in a high speed dispenser to prepare antifouling coating compositions A-G.

TABLE 1

| | Coating composition | | | | | | |
|---|---|---|---|---|---|---|---|
| Component | A | B | C | D | E | F | G |
| Water | 24.50 | 24.64 | 25.02 | 24.48 | 24.36 | 27.03 | 23.54 |
| Polymer binder suspension (50% wt solids) | 3.52 | 3.54 | 3.58 | 3.51 | 3.53 | 12.34 | 8.59 |
| Cuprous Oxide | 26.82 | 27.02 | 27.28 | 26.76 | 26.92 | 21.89 | 23.98 |
| Co-biocide A | 4.28 | — | — | — | — | 3.49 | 3.82 |

TABLE 1-continued

| Component | Coating composition | | | | | | |
|---|---|---|---|---|---|---|---|
| | A | B | C | D | E | F | G |
| Co-biocide B | — | 3.59 | — | — | — | — | — |
| Co-biocide C | — | — | 2.67 | — | — | — | — |
| Co-biocide D | — | — | — | 4.50 | — | — | — |
| Co-biocide E | — | — | — | — | 3.99 | — | — |
| Pigment | 33.83 | 34.07 | 34.26 | 34.20 | 33.93 | 27.75 | 30.42 |
| Solvent | 4.27 | 4.30 | 4.34 | 4.25 | 4.26 | 4.47 | 4.16 |
| Thixotopic Agent | 0.45 | 0.44 | 0.44 | 0.44 | 0.44 | 0.35 | 0.39 |
| Defoaming agents and surfactants | 2.33 | 2.40 | 2.41 | 1.92 | 1.97 | 2.68 | 5.10 |
| TOTAL | 100.0 | 100.0 | 100.0 | 100.0 | 100.0 | 100.0 | 100.0 |
| PVC | 85.79 | 85.79 | 85.79 | 85.79 | 85.13 | 60 | 70 |
| VOC of the coating (g/l) as formulated | 94 | 94 | 94 | 94 | 94 | 76 | 83 |
| Viscosity of the coating (poise) | 0.88 | 0.71 | 1.02 | 1.98 | — | 0.72 | 0.77 |
| Comments | — | — | — | — | + | ++ | ++ |

+ Comparative Example (co-biocide is Zinc Pyrithione). Paint was found not to be stable in one-pack system; paint solidified during manufacture.
++ Comparative Example (PVC is outside claimed range)

The polymer binder suspension is Primal AC-261-K Emulsion obtained from Dow Chemicals
The copper based biocide A is Cuprous Oxide LoLo Tint LM obtained from American Chemet Corporation
The co-biocide A is Copper Pyrithione obtained from Arch Chemicals
The co-biocide B is Preventol A5S obtained from Lanxess
The co-biocide C is Irgarol 1051 obtained from Ciba Geigy
The co-biocide D is Zineb obtained from Dequisa
The co-biocide E is Zinc Pyrithione obtained from Arch Chemicals
The pigment is a mixture of Zinc Oxide, Talc, Barium Sulphate and colouring pigment.
The thixotropic package is Organo Clay Bentone Lt obtained from Elementis Specialities
The solvent is a mixture of texanol and monopropylene glycol.
The defoaming agents and surfactants is a mixture of Orotan 731 A ER (obtained from Dow Chemicals), Genapol PF 40 (obtained from Clariant) and Foamaster NDW (obtained from Cognis Corporation).
The volatile organic content (VOC) was determined, by the method of ISO3251.
The viscosity of the coating was determined in accordance with ASTM standard D 4287-00.

Coating Test Result (1)

As a test of antifouling performance the Coatings Preparations Examples A-E were each applied to plywood boards which had been pre-painted with a commercial anticorrosive primer Interprotect, International Paint. As a control, an industry-leading solvent-based anti-fouling paint, Micron Extra Red (from International Paint), was also applied to the plywoods boards which had been pre-painted with a commercial anticorrosive primer Interprotect (from International Paint). The boards were immersed in the sea at Newton Ferrers in the UK.

The paint films were periodically assessed for settlement of marine fouling organisms. Fouling coverage was assessed in four main ecologically derived fouling categories: microfouling, weed, soft-bodied animal, and hard-bodied animal, and analysis was carried out visually on these four fouling categories, as this provided sufficient information to differentiate between coating performances.

The results for coating preparations A-E, the solvent-based control anti-fouling paint and the non-toxic primer after 13 months immersion at the test site are shown in Table 2.

TABLE 2

| Coating Preparation | % microfouling | % weed | % soft bodied animal | % hard bodied animal |
|---|---|---|---|---|
| A | 60 | 10 | 0 | 0 |
| B | 30 | 50 | 0 | 0 |
| C | 30 | 60 | 0 | 0 |
| D | 30 | 60 | 0 | 0 |
| E | 60 | 20 | 0 | 0 |
| Micron Extra Red (control) | 60 | 0 | 0 | 0 |
| Non-toxic (Primer) | 0 | 60 | 0 | 40 |

This demonstrates that the waterborne antifouling coating composition of the present invention performs just as well, and in some cases better than, an industry leading solvent-based anti-fouling coating composition (Micron Extra from International Paint) with respect to micro fouling, soft bodied animals and hard bodied animals. With respect to weed fouling, the anti-fouling performance of the coating compositions of the present invention was of an acceptable standard.

It was also noted that when the boards coated with compositions A-E were immersed in the sea, the colours of the coatings brightened and became considerably shinier.

Coating Test Result (2)

As a test of antifouling performance the Coatings Preparations Examples A, F and G were each applied to plywood boards which had been pre-painted with a commercial anti-corrosive primer Interprotect (from International Paint). The boards were immersed in the sea at Newton Ferrers in the UK.

After 12 months immersion at the test site, the amount of weed fouling coverage was assessed visually. The results are shown in Table 3.

TABLE 3

| Coating Preparation | % weed |
|---|---|
| A | 20 |
| F | 50 |
| G | 80 |

This demonstrates that, surprisingly, the waterborne antifouling coating composition of the present invention (coating preparation A) performs better, with respect to weed fouling, than the comparative examples outside the claimed invention (coating preparations F and G).

Storage Stability Test

Coating Preparations A and C were stored for 6 months at 45 degrees C. The Viscosity Change and Grind Change were measured at the end of the 6 month period.

The "Grind Change" refers to the particle size increase (In microns) at the end of the storage period. The particle size was measured by use of a Hegman Grind gauge. The "Viscosity" change records the increase in viscosity (in poise) over the same period, measured using a Cone and Plate viscometer. The viscosity change and grind change were measured according to methods ASTM D 869 and ASTM D 1849.

Coating preparations which are considered to have a commercially acceptable storage stability have a Grind Change of less than 50 microns and a viscosity change of less than 0.5 poise.

The results as shown in Table 4 below:

TABLE 4

| Coating Preparation | Grind change (microns) | Viscosity change (poise) |
|---|---|---|
| A | +20 | +0.12 |
| C | +20 | +0.2 |

Coating Preparations A and C are considered to be storage stable.

Self-Polishing Performance

As an indication of self-polishing performance, coatings compositions A-E and an equivalent leading solvent borne antifouling coating composition (Micron Extra Red from International Paint) were tested on a rotating disc apparatus of the type described in GB-A-1457590 (FIGS. 7a and 7b therein) and the film thickness measured before and after rotation in sea water over 30 days. The results are given in Table 5 below: the values given are loss of film thickness in microns. Initial dry film thickness was around 150 microns. A polishing rate of ~9 μm per month is typical of commercial antifouling systems.

TABLE 5

| Coating Composition | Film thickness loss (microns) |
|---|---|
| A | 9 |
| B | 12 |
| C | 9.5 |
| D | 5 |
| E | 8 |
| Micron Extra Red (control) | 7 |

This demonstrates that the polishing properties of the coatings of the present invention are similar to those of a leading solvent-borne equivalent coating. (Micron Extra from International Paint). This was an unexpected result as it would be expected that the very high PVC and low quantity of polymeric binder in the system of the present invention would act to increase polishing rate.

The invention claimed is:

1. A method of preventing fouling on a marine vessel in an aqueous environment, the method comprising coating the marine vessel with a waterborne antifouling coating composition and submersing the coated marine vessel in the aqueous environment, wherein the waterborne antifouling coating composition comprises
    i. a binder polymer,
    ii. a pigment, and
    iii. no biocide, or a biocide selected from
        (a) a copper biocide or a copper biocide in combination with at least one or more co-biocide(s), or
        (b) a copper-free biocide or a copper-free biocide in combination with at least one or more co-biocide(s), with the proviso that the biocide is not a copper biocide in combination with zinc pyrithione,
and wherein the pigment volume concentration of the waterborne antifouling coating composition is greater than 80% and less than 95%, and wherein the amount of the binder polymer in the waterborne antifouling coating composition ranges from 0.5 to 3.0 weight %, based on the total weight of all the components in the waterborne antifouling coating composition.

2. The method of claim 1, wherein the biocide is either a copper biocide or a copper biocide in combination with at least one co-biocide, with the proviso that the co-biocide is not zinc pyrithione.

3. The method of claim 1, wherein the pigment volume concentration is greater than 82% and less than 87%.

4. The method of claim 1, wherein the co-biocide(s) are selected from the group consisting of copper pyrithione, Zineb (zinc ethylene bis-dithiocarbamate), DCOIT (4,5-dichloro-2-(n-octyl)-3(2H)-isothiazolone), 2-methylthio-4-terbutylamino-6-cyclopropylamino-s-triazine, Tralopyril (4-bromo-2-(4-chlorophenyl)-5-(trifluoromethyl)-1H-pyrrole-3-carbonitrile), Dichlofluanid (1,1-dichloro-N-[(dimethylamino)sulfonyl]-1-fluoro-N-phenylmethanesulfenamide), Tolylfluanid (1,1-Dichlor-N-((dimethylamino)sulfonyl)-1-fluor-N-(4-methylphenyl)-methansulfenamid), 2,4,5,6-tetrachloro-isophthalonitrile, TCMTB (2-(thiocyanomethylthio)-benzothiazole), TMT (Tetramethylthiuram disulphide), ZDMC (Zinc dimethyldithiocarbamate), Maneb (Manganese Ethylene-bisdithiocarbamate) and Medetomidine (4-[1-(2,3-dimethylphenyl)ethyl]-3H-imidazole).

5. The method of claim 1, wherein the co-biocide(s) are selected from the group consisting of copper pyrithione, Zineb (zinc ethylene bis-dithiocarbamate), DCOIT (4,5-dichloro-2-(n-octyl)-3(2H)-isothiazolone, 2-methylthio-4-terbutylamino-6-cyclopropylamino-s-triazine, Tolylfluanid (1,1-Dichlor-N-((dimethylamino)sulfonyl)-1-fluor-N-(4-methylphenyl)-methansulfenamid), and zinc pyrithione.

6. The method of claim 1, wherein the copper biocide is selected from the group consisting of cuprous oxide and cuprous thiocyanate.

7. The method of claim 1, wherein the copper biocide is cuprous oxide.

8. The method of claim 1, wherein the amount of the binder polymer in the waterborne antifouling coating composition ranges between 1.2 to 2.5 weight % based on the total weight of all the components in the waterborne antifouling coating composition.

9. The method of claim 1, wherein the binder polymer is an acrylic resin.

10. The method of claim 1, wherein the binder polymer is present in the waterborne antifouling coating composition as a latex.

11. A marine vessel coated with the waterborne antifouling coating composition as defined in claim 1.

12. A yacht coated with the waterborne antifouling coating composition as defined in claim 1.

13. The method of claim 2, wherein the pigment volume concentration is greater than 82% and less than 87%.

14. The method of claim 3, wherein the co-biocide(s) are selected from the group consisting of copper pyrithione, Zineb (zinc ethylene bis-dithiocarbamate), DCOIT (4,5-dichloro-2-(n-octyl)-3(2H)-isothiazolone, 2-methylthio-4-terbutylamino-6-cyclopropylamino-s-triazine, Tolylfluanid (1,1-Dichlor-N-((dimethylamino)sulfonyl)-1-fluor-N-(4-methylphenyl)-methansulfenamid), and zinc pyrithione.

15. The method of claim 4, wherein the copper biocide is selected from the group consisting of cuprous oxide and cuprous thiocyanate.

16. The method of claim 3, wherein the amount of the binder polymer in the waterborne antifouling coating composition ranges between 1.2 to 2.5 weight % based on the total weight of all the components in the waterborne antifouling coating composition.

17. The method of claim 6, wherein the binder polymer is an acrylic resin.

18. The method of claim 8, wherein the binder polymer is an acrylic resin.

\* \* \* \* \*